(12) United States Patent
Weiler et al.

(10) Patent No.: US 10,207,679 B2
(45) Date of Patent: Feb. 19, 2019

(54) FASTENING DEVICE FOR A WINDSCREEN WIPER DEVICE

(71) Applicant: Robert Bosch GmbH, Stuttgart (DE)

(72) Inventors: Michael Weiler, Buehl (DE); Peter Deak, Budapest (HU); Viktor Hackl, Sopron (HU); Gabor Palusek, Dunaharaszti (HU)

(73) Assignee: Robert Bosch GmbH, Stuttgart (DE)

( * ) Notice: Subject to any disclaimer, the term of this patent is extended or adjusted under 35 U.S.C. 154(b) by 438 days.

(21) Appl. No.: 15/052,642

(22) Filed: Feb. 24, 2016

(65) Prior Publication Data
US 2016/0244024 A1 Aug. 25, 2016

(30) Foreign Application Priority Data
Feb. 25, 2015 (DE) .................. 10 2015 203 371

(51) Int. Cl.
*B60S 1/04* (2006.01)
*B60S 1/34* (2006.01)
*B60S 1/38* (2006.01)

(52) U.S. Cl.
CPC .......... *B60S 1/0441* (2013.01); *B60S 1/3459* (2013.01); *B60S 1/3801* (2013.01); *B60S 2001/3812* (2013.01); *B60S 2001/3825* (2013.01)

(58) Field of Classification Search
CPC ..... B60S 1/0441; B60S 1/0447; B60S 1/3459
USPC ..................................... 15/250.34
See application file for complete search history.

(56) References Cited

U.S. PATENT DOCUMENTS

2014/0338145 A1* 11/2014 Jung ................ B60S 1/3488
15/250.34

FOREIGN PATENT DOCUMENTS

FR          2954249 A1    6/2011
WO       2014072186 A1    5/2014

OTHER PUBLICATIONS

WO2014072186A1 (machine translation), 2014.*

* cited by examiner

*Primary Examiner* — Andrew A Horton
(74) *Attorney, Agent, or Firm* — Michael Best & Friedrich LLP (57) ABSTRACT

A fastening device (100, 200) configured to fasten a windscreen wiper device on a fastening element (50) of a vehicle, in particular of a motor vehicle. The fastening device (100) comprises: a first receiving region (110), into which the fastening element (50) can be introduced; and a securing element (120) mounted rotatably about a first axis of rotation (122), wherein the first axis of rotation (122) extends substantially perpendicular to a longitudinal extent (51) of the fastening element (50), and wherein the securing element (120) is configured to form an engagement with the fastening element (50) through a first rotation (124) about the first axis of rotation (122).

23 Claims, 9 Drawing Sheets

FASTENING DEVICE FOR A WINDSCREEN WIPER DEVICE

BACKGROUND OF THE INVENTION

The disclosure relates to a fastening device designed to fasten a windscreen wiper device on a fastening element of a vehicle, in particular of a motor vehicle, to a windscreen wiper device for a vehicle, to a method for fastening a fastening device for a windscreen wiper device on a fastening element of a vehicle, and to a method for releasing a fastening device for a windscreen wiper device from a fastening element of a vehicle.

Windscreen wiper devices typically have a wiper arm or wiper lever, wherein a wiper blade, on which a wiper lip is fastened, is moved over the windscreen of a motor vehicle. The wiper arm is moved in alternation between a first turning position and a second turning position. For this purpose, the wiper arm can be connected to a wiper motor via the drive shaft.

There are a plurality of boundary conditions which have to be taken into consideration when improving windscreen wiper devices. These boundary conditions include the expenditure during production or the production costs, the material costs, and also the properties of the windscreen wiper device, in particular operation under diverse conditions and longevity under a multiplicity of conditions. In the case of wiper devices for vehicles, it is necessary to take into account the fact that cost pressure increases continuously and that the vehicles may be used in a wide variety of climatic conditions, such that extreme temperature values for example arise permanently and/or with large variations.

Wear phenomena, which are associated with an impairment of the wiping quality, commonly arise in the case of windscreen wiper devices, in particular in the case of wiper blades, owing to the regular use thereof. Moreover, as a result of the exposed position of windscreen wiper devices on the front windscreen or rear windscreen of motor vehicles, there is the risk, particularly when moving through a washing system, that the windscreen wiper device will be damaged or even torn off. In these cases, it is necessary to replace the worn or damaged windscreen wiper devices. The replacement of windscreen wiper devices is traditionally relatively complex since these are usually fastened to the drive shaft via screwed connections.

There is therefore a need to provide fastening devices for windscreen wiper devices which can be replaced easily and with reduced expenditure. In particular, there is a need to provide fastening devices for windscreen wiper devices which can be mounted on, and disassembled from, a drive shaft of a vehicle easily and with reduced expenditure.

SUMMARY OF THE INVENTION

It is an object of the present disclosure to provide a fastening device for a windscreen wiper device with which at least one or more of the aforementioned disadvantages are reduced or essentially do not arise.

According to embodiments of the present disclosure, what is specified is a fastening device designed to fasten a windscreen wiper device on a fastening element of a vehicle, in particular of a motor vehicle. The fastening device comprises a first receiving region, into which the fastening element can be introduced; and a securing element mounted rotatably about a first axis of rotation, wherein the first axis of rotation extends substantially perpendicular to a longitudinal extent of the fastening element, and wherein the securing element is designed to form an engagement with the fastening element through a first rotation about the first axis of rotation.

According to further embodiments of the present disclosure, what is specified is a windscreen wiper device for a vehicle, in particular a motor vehicle. The windscreen wiper device comprises a fastening device and a wiper blade mountable on the fastening device. The fastening device comprises a first receiving region, into which a fastening element of the vehicle can be introduced; and a securing element mounted rotatably about a first axis of rotation, wherein the axis of rotation extends substantially perpendicular to a longitudinal extent of the fastening element, and wherein the securing element is designed to form an engagement with the fastening element through a first rotation about the first axis of rotation.

According to yet further embodiments of the present disclosure, what is specified is a method for fastening a fastening device for a windscreen wiper device on a fastening element of a vehicle. The method comprises introducing the fastening element into a first receiving region of the fastening device; and rotating a securing element of the fastening device about a first axis of rotation extending substantially perpendicular to a longitudinal extent of the fastening element in order to form an engagement between the securing element and the fastening element.

According to other embodiments of the present disclosure, what is specified is a method for releasing a fastening device for a windscreen wiper device from a fastening element of a vehicle. The method comprises rotating a securing element of the fastening device about a first axis of rotation extending substantially perpendicular to a longitudinal extent of the fastening element in order to release an engagement between the securing element and the fastening element; and moving the fastening element and the fastening device apart.

The fastening device according to the present disclosure can be easily mounted on, and disassembled from, a drive shaft of a vehicle. In particular, the fastening device according to the present disclosure can be mounted on, and disassembled from, a drive shaft of a vehicle without an additional tool. Accordingly, in the case of damage, for example, it is possible for a wiper blade to easily be replaced, or before moving through a washing system it is possible for a wiper blade to easily be removed and then mounted again.

Preferred, optional embodiments and particular aspects of the disclosure will become apparent from the dependent claims, the drawings and the present description.

In accordance with the fastening device described herein and owing to the method for mounting and disassembling the fastening device, it is possible for a windscreen wiper device to be mounted and disassembled in a simple manner. The fastening device can be connected to the fastening element, which may be a drive axle for the windscreen wiper device, by a single rotational movement. Accordingly, the windscreen wiper device can be replaced easily in the case of damage, or before moving through a washing system the windscreen wiper device can easily be removed and then mounted again.

According to a number of embodiments, which can be combined with other embodiments described here, the securing element is designed to form a force fit and/or a form fit with the fastening element through the first rotation about the first axis of rotation. Provision is therefore made of a fastening device which can be fastened firmly and securely on the fastening element. The force fit and/or form fit makes it possible in particular to prevent release of the fastening device from the fastening element of the vehicle, for example during operation of a windscreen wiper device.

In some embodiments, which can be combined with other embodiments described here, the fastening device comprises a main body, wherein the first receiving region is formed in the main body. The fastening device can therefore be produced in a simple and cost-effective manner.

By way of example, the first receiving region may be an opening, recess or a through-hole in the fastening device, and in particular in the main body of the fastening device. The fastening device can therefore be mounted in a simple manner by introduction of the fastening element into the opening or recess or the through-hole.

In a number of implementations, the fastening device comprises a second receiving region, which can be formed for example in the main body and which can be designed to receive the securing element. The fastening device can therefore be produced in a simple and cost-effective manner.

According to a number of embodiments, which can be combined with other embodiments described here, the securing element has a first portion and a second portion, wherein the first portion is designed for the engagement with the fastening element, and wherein the second portion is designed as an actuating device. By way of example, the first portion and the second portion can form a substantially L-shaped configuration. The fastening device can therefore be produced in a simple and cost-effective manner. It is also possible for the engagement to be produced and released again in a simple manner.

In some embodiments, which can be combined with other embodiments described here, the engagement can be released by a second rotation which may be directed counter to the first rotation. The engagement can therefore be released in a simple manner.

In a number of embodiments, the first axis of rotation extends substantially perpendicular to a second axis of rotation of the fastening element. By way of example, the fastening element may be a drive shaft rotatable about the second axis of rotation. The drive shaft can be connected to a wiper motor in order to move a wiper blade over the windscreen of the motor vehicle.

According to a number of implementations, the fastening device comprises at least one stop element or limit stop element designed to delimit the first rotation. It is therefore possible to provide for optimum positioning of the securing element for a stable and firm engagement of the securing element and of the fastening element.

According to a number of embodiments, which can be combined with other embodiments described here, the fastening device can be connected, and in particular can be connected releasably, to a wiper blade. It is therefore possible for the fastening device to be used in combination with various types of wiper blades. In the case of damage to the wiper blade, for example, it is also possible for only the wiper blade to be replaced, and the fastening device can be reused. Maintenance costs and/or repair costs can therefore be reduced.

According to embodiments of the present disclosure, the wiper blade comprises an elongated top part configured to be at least partially bendable, an elongated bottom part configured to be at least partially bendable, a plurality of connecting elements for connecting the top part and the bottom part, wherein the connecting elements are spaced apart from one another along a longitudinal extent of the wiper blade and are fitted to the top part and/or to the bottom part by means of a rotary joint, in particular wherein the connecting elements are designed to allow for a movement of the top part and of the bottom part in relation to one another with a movement component along the longitudinal extent of the wiper blade. Such fin-ray windscreen wiper devices for vehicle windscreens can be produced in a particularly expedient manner and/or for a plurality of different fields of use.

BRIEF DESCRIPTION OF THE DRAWINGS

Exemplary embodiments of the disclosure are illustrated in the figures and will be described in more detail hereinbelow. In the drawings.

DETAILED DESCRIPTION

Hereinbelow, unless specified otherwise, the same reference signs are used for the same elements and for elements having the same action.

Figure 1:
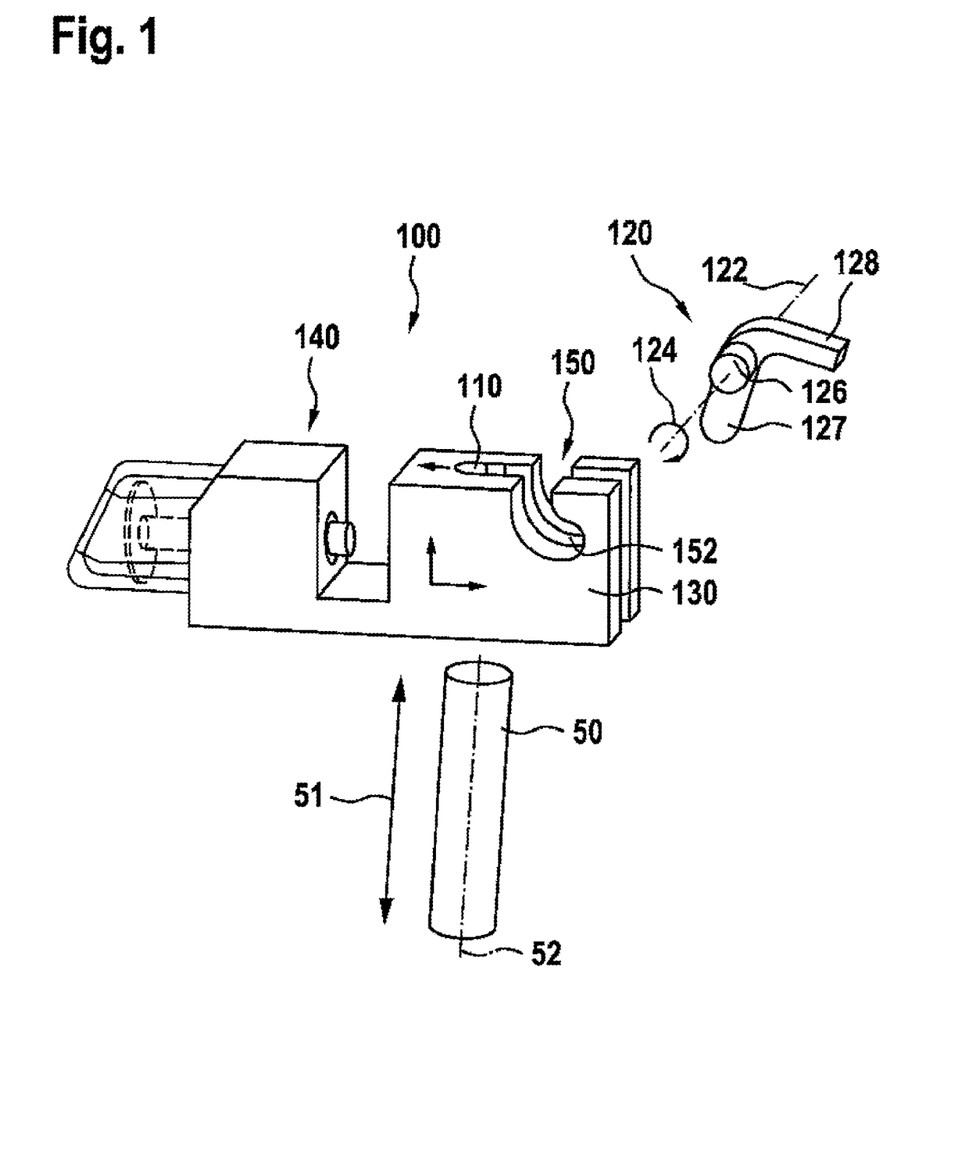
FIG. 1 shows a schematic illustration of a fastening device according to embodiments of the present disclosure.
Figure 2A:
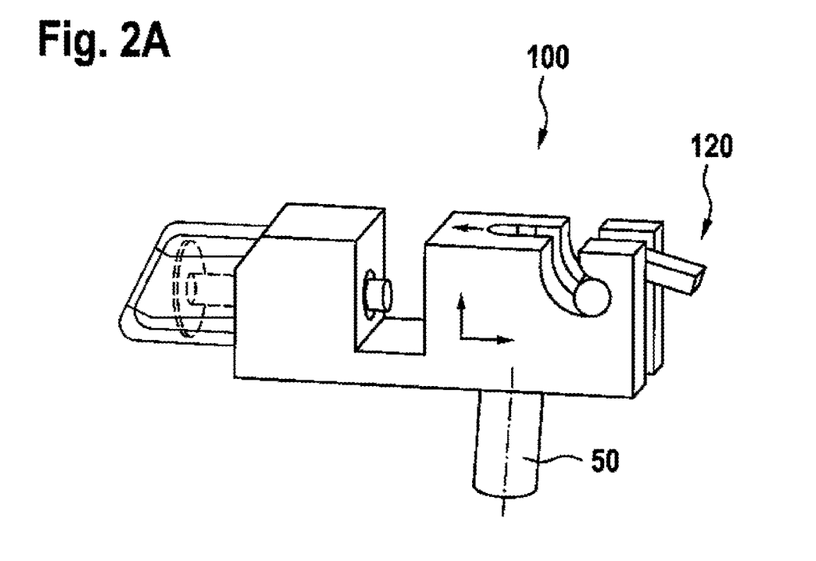
FIGS. 2A through 2C show perspective illustrations of the fastening device shown in FIG. 1 from different viewing angles.
Figure 2B:
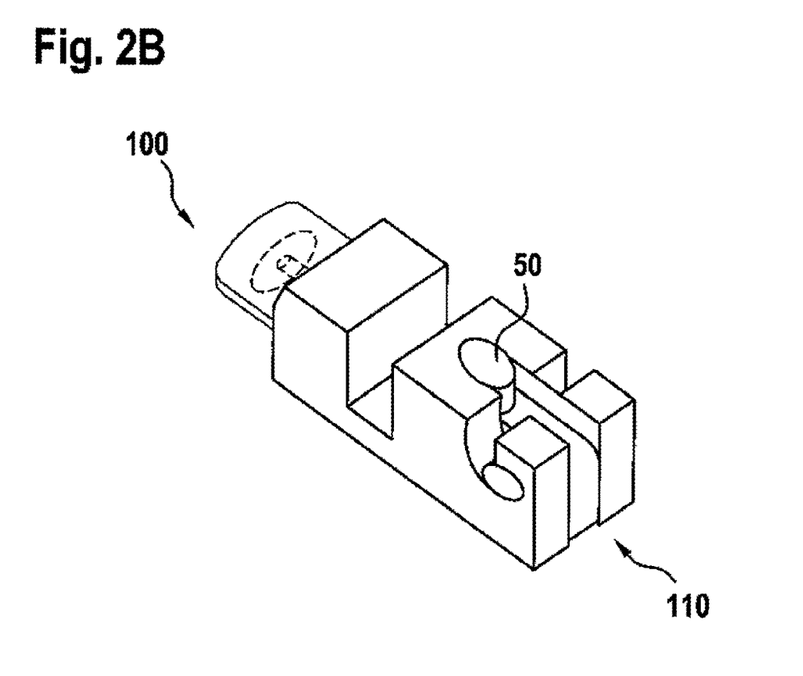
Figure 2C:
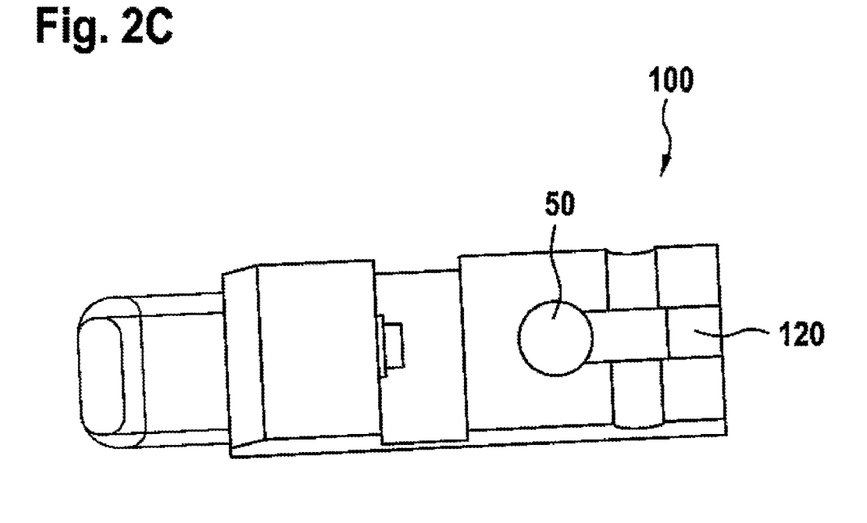

FIG. 1 shows a schematic illustration of a fastening device 100 according to embodiments of the present disclosure. FIGS. 2A through 2C show perspective illustrations of the fastening device 100 shown in FIG. 1 from different viewing angles.

The fastening device 100 comprises a first receiving region 110, into which the fastening element 50 of the vehicle can be introduced; and a securing element 120 mounted rotatably about a first axis of rotation 122, wherein the first axis of rotation 122 extends substantially perpendicular to a longitudinal extent 51 of the fastening element 50, and wherein the securing element 120 is designed to form an engagement with the fastening element 50 through a first rotation 124 about the first axis of rotation 122. The fastening device 100 can therefore be connected to the fastening element 50, which may be a drive axle or drive shaft, by a single rotational movement. In particular, no tool is required for mounting.

The fastening device 100 according to the embodiments described here can be used, for example, for rear windscreen wiper devices. The present disclosure is not limited thereto, however, and the fastening device 100 according to the embodiments described here can also be used for front windscreen wiper devices.

According to a number of embodiments, which can be combined with other embodiments described here, the securing element 120 is designed to form a force fit and/or a form fit with the fastening element 50 through the first rotation 124 about the first axis of rotation 122. The fastening device 100 can therefore be mounted firmly and securely on the fastening element 50. The force fit and/or form fit makes it possible in particular to prevent release of the fastening device 100 from the fastening element 50 of the vehicle, for example during operation of a windscreen wiper device.

According to embodiments of the disclosure, which can be combined with other embodiments, a "force fit" is understood to mean all connections which are formed by the transfer of forces (e.g. force-fitting connections, frictional connection). In particular, such connections make use of compressive forces and/or frictional forces. The cohesion of these connections is achieved by the active force.

By way of example, the fastening element 50 can have a surface structure in order to increase a frictional force between the fastening device 100, and in particular the securing element 120, and the fastening element 50. As a result, the fastening device 100 can be mounted firmly and securely on the fastening element 50. By way of example, at least part of the surface of the fastening element 50 and/or of the surface of the securing element 120 can be roughened.

According to embodiments of the disclosure, which can be combined with other embodiments, a "form fit" is understood to mean all connections which are formed by at least two elements engaging into one another (form-fitting connections). In particular, as a result of the mechanical connection, the elements cannot be released even without force transfer or with interrupted force transfer. By way of example, the fastening element 50 can have a recess, into which the securing element 120 can engage. As a result, the fastening device 100 can be mounted firmly and securely on the fastening element 50.

In some embodiments, which can be combined with other embodiments described here, the engagement can be released by a second rotation which may be directed counter to the first rotation 124. The engagement can therefore be released in a simple manner.

According to embodiments, the securing element 120 may be rotatable between a first position and a second position. In particular, the first rotation 124 may be defined or may take place between the first position and the second position. The first position may be a released position, i.e. a position in which the securing element 120 is not in engagement with the fastening element 50. The second position may be a position in which the securing element 120 is in engagement with the fastening element 50.

The first rotation 124 and/or the second rotation may typically be a rotation in a range of 45° to 135°, and may in particular be a rotation through approximately 90°. By way of example, the first rotation 124 and/or the second rotation of the securing element 120 between the first position and the second position may be a rotation in a range of 45° to 135°, and may in particular be a rotation through approximately 90°.

According to a number of embodiments, which can be combined with other embodiments described here, the fastening device 100 can be connected, and in particular can be connected releasably, to a wiper blade (not shown). It is therefore possible for the fastening device 100 to be used in combination with various types of wiper blades. In the case of damage to the wiper blade, for example, it is also possible for only the wiper blade to be replaced, and the fastening device 100 can be reused. Maintenance costs and/or repair costs can therefore be reduced. The fastening device 100 according to the embodiments described here can also be referred to as an "adapter".

In some embodiments, which can be combined with other embodiments described here, the fastening device 100 comprises a main body 130, wherein the first receiving region 110 can be formed in the main body 130. The fastening device 100 can therefore be produced in a simple and cost-effective manner.

By way of example, the main body 130 can have a substantially rectangular shape. The first receiving region 110 can have a first portion and a second portion adjoining the first portion. The first receiving region 110 can be formed in the first portion. A wiper-blade-side mounting device 140 can be arranged in the second portion. The wiper-blade-side mounting device 140 can be designed for the connection to the wiper blade (not shown). By way of example, the wiper-blade-side mounting device 140 can be designed for a force fit and/or a form fit with the wiper blade. According to embodiments, the wiper-blade-side mounting device 140 can comprise a fastener, for example a clamping fastener.

According to a number of embodiments, which can be combined with other embodiments described here, the first receiving region 110 may be an opening, recess or a through-hole in the fastening device 100, and in particular in the main body 130 of the fastening device 100. By way of example, the first receiving region 110 can have a substantially cylindrical shape. The fastening device 100 can therefore be mounted in a simple manner by introduction of the fastening element 50 into the opening, recess or the through-hole.

In a number of implementations, the fastening device 100 comprises a second receiving region 150, which can be formed for example in the main body 130 and which can be designed to receive the securing element 120. The fastening device 100 can therefore be produced in a simple and cost-effective manner.

Typically, the first receiving region 110 and the second receiving region 150 can be connected to one another. Therefore, the securing element 120 arranged in the second receiving region can engage into the first receiving region 110 or overlap it in order to produce the engagement with the fastening element 50.

According to a number of embodiments, which can be combined with other embodiments described here, the second receiving region 150 has at least one undercut 152, into which at least part of the securing element 120 can be inserted. By way of example, the securing element 120 can have at least one protrusion 126, which can be inserted into the at least one undercut 152. The at least one protrusion 126 can be mounted rotatably in the at least one undercut 152. By way of example, the at least one protrusion 126 and the at least one undercut 152 can define or form the first axis of rotation 122. The undercut 152 can also be referred to as a "guide opening".

According to a number of embodiments, which can be combined with other embodiments described here, the securing element 120 has a first portion 127 and a second portion 128, wherein the first portion 127 is designed for the engagement with the fastening element 50, and/or wherein the second portion 128 is designed as an actuating device. In some embodiments, which can be combined with other embodiments described here, the engagement can be produced and/or released by actuation of the actuating device (for example pushing). In particular, actuation of the actuating device can generate the first rotation 124 for producing the engagement and the second rotation, directed counter to the first rotation, for releasing the engagement. By way of example, it may be possible to generate the first rotation by pushing the actuating device, and it may be possible to generate the second rotation by pulling the actuating device. Typically, the actuating device can be formed as a lever.

In a number of embodiments, the first portion 127 and the second portion 128 can form a substantially L-shaped configuration. By way of example, the first portion 127 can be a first leg of the L shape, and the second portion 128 can be a second leg of the L shape.

In a number of embodiments, the first axis of rotation 122 extends substantially perpendicular to a second axis of rotation 52 of the fastening element 50. By way of example, the fastening element 50 may be a drive shaft rotatable about the second axis of rotation 52. The drive shaft can be connected to a wiper motor in order to move a wiper blade over the windscreen of the motor vehicle. According to embodiments, the first axis of rotation 122 may be substantially perpendicular to a longitudinal extent of the wiper blade (denoted by the reference sign "8" in FIGS. 5-7).

The term "substantially perpendicular" is also intended to include embodiments in which there is a deviation of several degrees from an exact perpendicular orientation, for example up to 10° or even up to 20°.

FIGS. 3a through 3e show schematic illustrations of a sequence for fastening the fastening device 100 on the fastening element 50 of the vehicle according to embodiments of the present disclosure.

FIGS. 3a through 3e show in particular a sequence of a method for fastening a fastening device 100 for a windscreen wiper device on the fastening element 50 of a vehicle according to embodiments of the disclosure. The method comprises introducing the fastening element 50 into the first receiving region of the fastening device 100; and rotating the securing element 120 of the fastening device 100 about the first axis of rotation extending substantially perpendicular to the longitudinal extent 51 of the fastening element 50 in order to form an engagement between the securing element 120 and the fastening element 50. The fastening device 100 can be formed according to the embodiments described here.

Figure 3A:
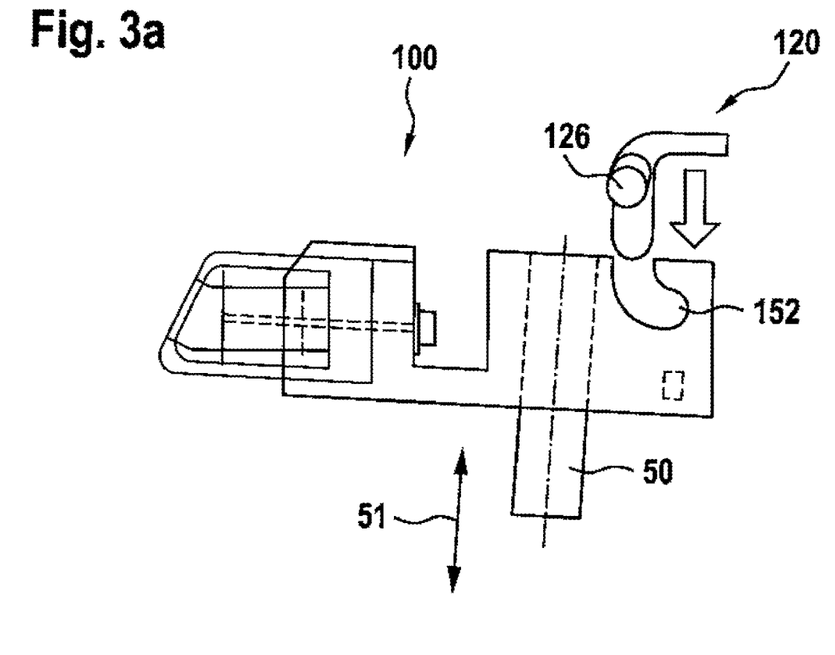
FIGS. 3a through 3e show schematic illustrations of a sequence for fastening the fastening device on a fastening element of the vehicle according to embodiments of the present disclosure.
Figure 3B:
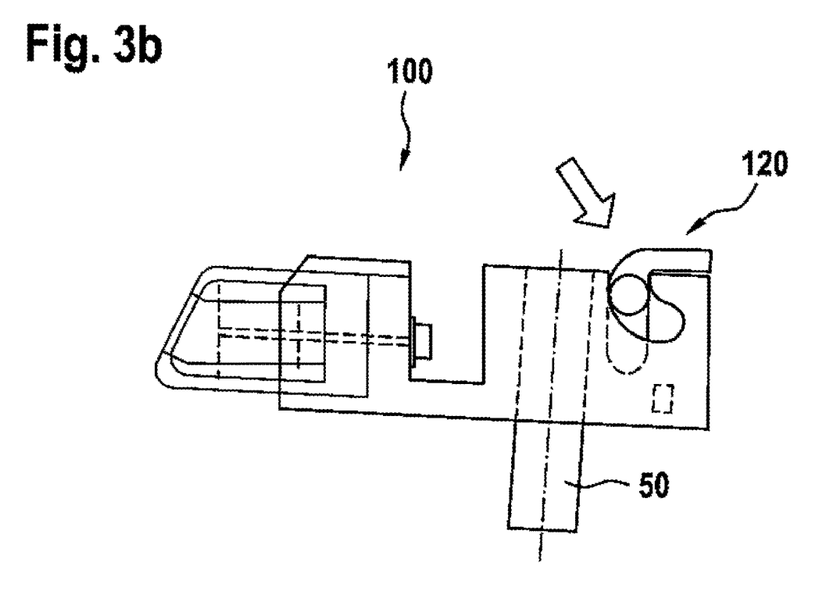
Figure 3C:
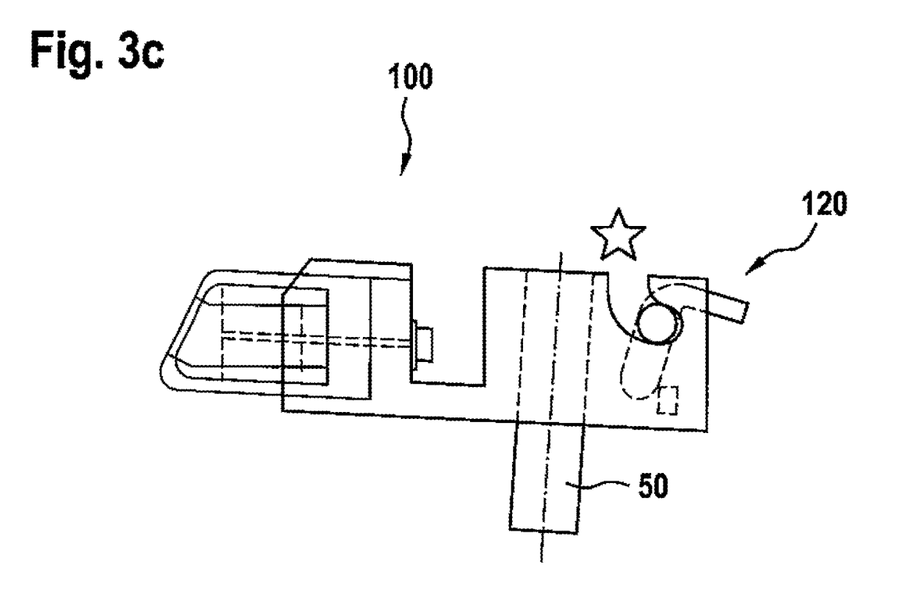

With reference to FIGS. 3a through 3c, the securing element 120 can be inserted into the second receiving region, for example after the introduction of the fastening element 50 into the first receiving region of the fastening device 100. For this purpose, the securing element 120, and in particular the at least one protrusion 126, can be introduced into the at least one undercut 152. The securing element 120 can be pushed or pressed as far as an end position, for example by a user's finger.

Figure 3D:
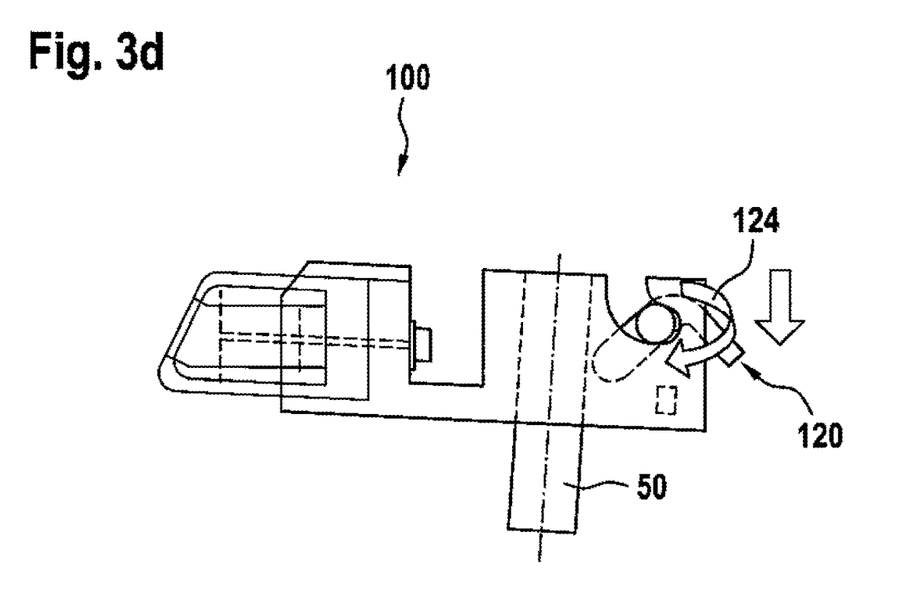
Figure 3E:
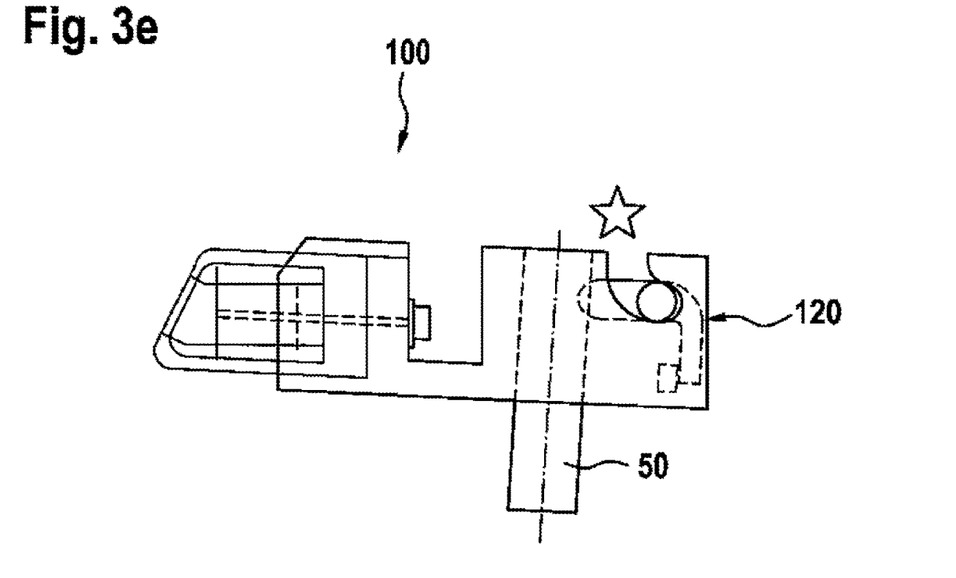

As is shown in FIGS. 3d and 3e, the first rotation 124 can produce the engagement between the securing element 120 and the fastening element 50. According to a number of embodiments, which can be combined with other embodiments described here, the securing element 120 can be rotated through approximately 90° in order to produce the engagement with the fastening element 50.

The engagement between the securing element 120 and the fastening element 50 can be releasable. By way of example, the engagement can be released by a method according to the embodiments described here. The method comprises rotating the securing element 120 of the fastening device 100 about a first axis of rotation extending substantially perpendicular to a longitudinal extent 51 of the fastening element 50 in order to release the engagement between the securing element 120 and the fastening element 50; and moving the fastening element 50 and the fastening device 100 apart. The fastening device 100 can be formed according to the embodiments described here.

Figure 4:
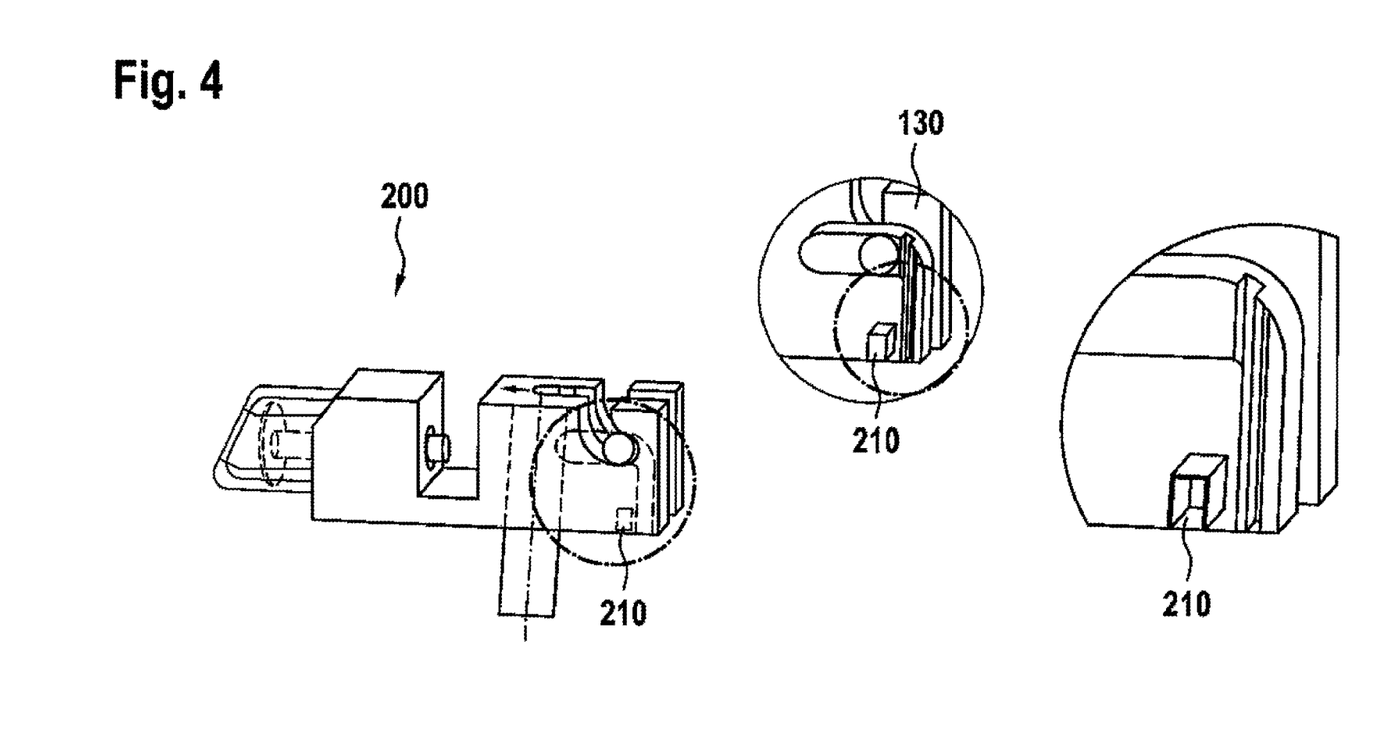
FIG. 4 shows a schematic illustration of a fastening device according to further embodiments of the present disclosure.

FIG. 4 shows schematic illustrations and partial illustrations of a fastening device 200 according to further embodiments of the present disclosure.

The description given in relation to the fastening device with reference to FIGS. 1 to 3 applies analogously to the embodiment of FIG. 4, and only the differences will be explained hereinbelow.

According to a number of embodiments, which can be combined with other embodiments described here, the fastening device 200 comprises at least one stop element or limit stop element 210 designed to delimit the first rotation. The stop element or limit stop element 210 can be arranged in the main body 130. According to embodiments, the stop element or limit stop element 210 can also be referred to as a "safety stopper".

Typically, the stop element or limit stop element 210 can be arranged in such a way that the second portion 128 (for example the actuating device) strikes against the stop element or limit stop element 210 and the first rotation is delimited once the engagement between the securing element 120 and the fastening element 50 has been produced. By way of example, the stop element or limit stop element 210 can be arranged in such a way that the second portion 128 (actuating device) strikes against the stop element or limit stop element 210 when a rotation through approximately 90° has been performed.

As is explained with reference to FIG. 1, it may be the case that the securing element 120 is rotatable between the first position and the second position. By way of example, the stop element or limit stop element 210 can be arranged in a region of the second position.

The text below describes aspects of an exemplary windscreen wiper device for which the embodiments of the fastening device described herein are particularly advantageous.

Figure 5A:
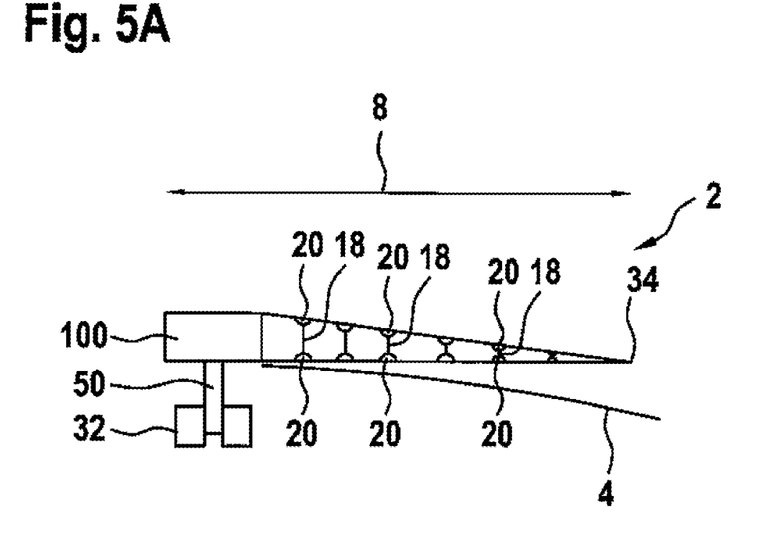
FIG. 5A shows a schematic illustration of a windscreen wiper device having a wiper blade according to embodiments of the disclosure in a basic position.
Figure 5B:
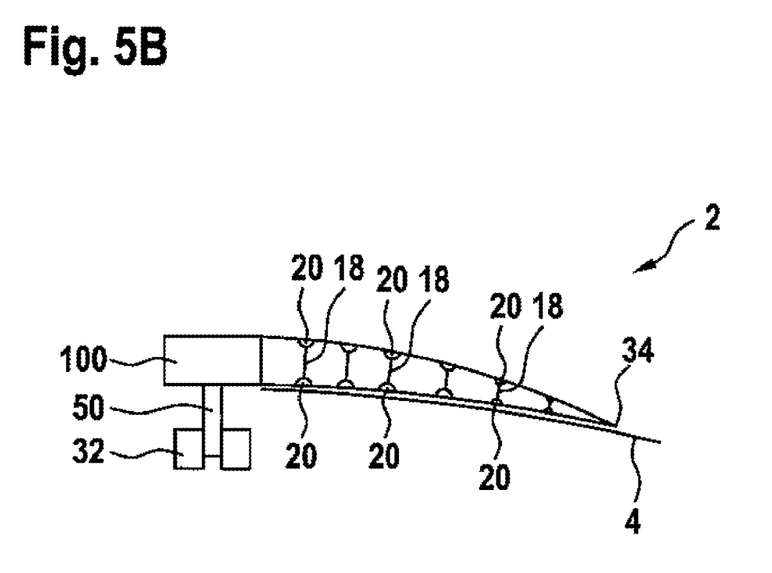
FIG. 5B shows a schematic illustration of the windscreen wiper device according to embodiments of the disclosure as shown in FIG. 5A in a position applied to a windscreen.

FIGS. 5A and 5B show schematic illustrations of a wiper blade 2 in a basic position and in a position applied to a windscreen 4 according to embodiments of the windscreen wiper device of the disclosure. The wiper blade 2 serves for wiping the windscreen 4 of a vehicle, which, for example, is a motor vehicle, in particular an automobile.

According to embodiments, the wiper blade 2 has an elongated top part 10 and an elongated bottom part 12, which are configured to be at least partially bendable, wherein the bottom part 12 faces toward a windscreen 4 during operation of the windscreen wiper device. Furthermore, provision is made of a plurality of connecting elements 18 for connecting the top part 10 and the bottom part 12, wherein the connecting elements 18 are spaced apart from one another along a longitudinal extent 8 of the wiper blade and are fitted to the top part 10 and/or to the bottom part 12 by means of a rotary joint 20. The connecting elements 18 are designed to allow for a movement of the top part 10 and of the bottom part 12 in relation to one another with a movement component along the longitudinal extent 8 of the wiper blade 2. In this respect, the connecting elements are connected to the top part 10 at a respective upper connecting position and to the bottom part 12 at a respective lower connecting position. By way of example, a rotary joint 20 is provided at each of the connecting positions. When the top part 10 and the bottom part 12 move in relation to one another, the spacing between an upper connecting position and a lower connecting position on the same connecting element substantially does not change, i.e. the spacing is constant with deviations of, for example, ±1 mm, in particular ±0.3 mm.

Along the longitudinal extent 8 of the wiper blade 2, the spacing between the top part 10 and the bottom part 12 becomes smaller proceeding from the wiper blade head, at least in regions of the longitudinal extent 8 of the wiper blade 2 or over a predominant part of the longitudinal extent 8 of the wiper blade 2; see FIGS. 5A, 5B, 6 and 7. Proceeding from the head end, the height of the wiper blade 2 tapers like a wedge in regions, or becomes smaller in regions of the longitudinal extent 8. By way of example, according to embodiments for a plurality of the connecting elements 18, the length of the connecting elements 18 can be provided in such a manner that the connecting elements 18 provided in the vicinity of the wiper blade head are longer than those on the opposite side, i.e. at a connecting position 34 of the wiper blade 2 along the longitudinal extent 8. According to some embodiments, provision is made of at least 5 connecting elements, in particular at least 7 connecting elements.

According to embodiments, the wiper blade 2 comprises a wiper lip (not shown) arranged on the bottom part 12 of the wiper blade 2. The wiper lip is typically located on the bottom side of the bottom part 12, said bottom side being remote from the top part 10. The wiper lip can be designed to be positioned on the windscreen of the vehicle for wiping purposes. For reasons of clarity, the wiper lip is not shown in the figures.

Both the top part 10 and the bottom part 12 are bendable bars or can be configured as bendable bars. It is similarly possible to configure only part of the top part 10 and/or part of the bottom part 12 in bendable form. According to some embodiments, which can be combined with the other embodiments described here, a material having a modulus of elasticity in a range of between 0.005 kN/mm$^2$ and 0.5 kN/mm$^2$, in particular between 0.01 kN/mm$^2$ and 0.1 kN/mm$^2$, is used for the top part 10 and/or the bottom part 12. This makes it possible to achieve a suitable bending capacity of the top part 10 and of the bottom part 12. Together with a suitably configured cross-sectional area of the top part 10 and of the bottom part 12, this gives rise to an optimum flexural rigidity.

The windscreen wiper device comprises the fastening device 100 according to the embodiments described here. By way of example, the fastening device 100 can be connectable to a wiper-blade-side fastening part of the wiper blade 2 or directly to the top part 10 and the bottom part 12. The fastening device 100 can be used to connect the windscreen wiper device to the vehicle or to the drive shaft of a windscreen wiper drive unit 32 (wiper motor) of the vehicle.

At that side which is located opposite the fastening device 100 or the wiper-blade-side fastening part along the longitudinal extent 8 of the windscreen wiper device, the top part 10 and the bottom part 12 are connected at the connecting position 34. The top part 10 and the bottom part 12 are connected to one another by connecting elements 18. The connecting elements 18 are configured in such a manner that the spacing between the connecting position with the top part 10 and the connecting position with the bottom part 12 varies by at most +/−1 mm, in particular varies by at most +/−0.3 mm (for example by thermal expansion and/or tension and compressive loading). Therefore, the connecting elements 18 substantially cannot have an elastic form, or the effect of the connecting elements 18 is based on the transfer of force thereby between the top part 10 and the bottom part 12, and not on the elasticity thereof.

The connecting elements 18 are fastened to mutually facing inner longitudinal sides of the top part 10 and of the bottom part 12 by means of rotary joints 20. The rotary joints 20 are typically hinges. In particular, the rotary joints 20 can be formed as film hinges. This is advantageous primarily when the top part 10, the bottom part 12 and/or the connecting elements 18 are produced from a plastic material or are coated with a suitable plastic material.

According to typical embodiments described here, which can be combined with other embodiments described here, a rotary joint 20 is selected from the following group consisting of: a hinge, a film hinge, a tapering of the material for producing lower rigidity along a torsion axis, a joint with an axis of rotation, a means for connecting the top part 10 to the connecting element 18 or for connecting the bottom part 12 to the connecting element 18, which permits the displacement of the bottom part 12 with respect to the top part 10 along the longitudinal extent 8, etc.

Embodiments in which the joints 20 are provided by film hinges consequently provide a very simple manner of providing the joints 20 for a fin-ray wiper. The wiper blade 2 can be provided in one piece, in particular in an off-tool manner. According to typical embodiments, the film hinges have a high expandability. This may be provided, for example, by a material selected from the group consisting of PP, PE, POM and PA. Alternatively, the film hinges may be produced from one or more materials selected from a group consisting of: TPE (thermoplastic elastomer), for example TPE-S, TPE-O, TPE-U, TPE-A, TPE-V and TPE-E.

The connecting elements 18 are spaced apart from one another along the longitudinal extent 8 of the wiper blade 2. The spacings are advantageously smaller than 50 mm, in particular smaller than 30 mm. It is thereby possible to ensure particularly high flexibility of the windscreen wiper device, in particular the bottom part 12 thereof, and good adaptation to the curvature and curvature changes of the windscreen 4 to be wiped.

FIG. 5B shows a schematic illustration of the wiper blade 2 according to FIG. 5A in a position applied to the windscreen 4. Since the windscreen 4 has a curvature, when the wiper blade 2 is applied to the windscreen 4, contact pressure forces act on the bottom part 12. Since the top part 10 and the bottom part 12 are bendable bars, and the connecting elements 18 are mounted rotatably on the top part 10 and bottom part 12, the top part 10 and the bottom part 12 can be displaced in relation to one another. As a result of the pressure forces acting from below on the bottom part 12, the wiper blade 2 bends in the direction from which the pressure forces originate and is applied precisely with respect to the curvature of the windscreen 4.

As a result of the structure of the embodiments described here, when a force acts on the bottom part 12 (as a result of the windscreen 4), the bottom part 12 bends in the direction from which the force acts. This is produced by the connection of the top part 10 and of the bottom part 12 at the connecting position 34, the shape and by rotary joints 20 at the connection between the connecting elements 18 and the top or bottom part. A windscreen wiper device according to embodiments described here uses the effect of tail fins of specific fish, which in the event of lateral pressure do not deviate in the pressure direction, but instead curve in the opposite direction, that is to say in the direction from which the pressure originates. This principle is also referred to as the "fin-ray" principle. As a result, a windscreen wiper device according to the embodiments described herein has the advantage of improved adaptation to a windscreen 4 of a motor vehicle. With a conventional windscreen wiper blade, the top part thereof is generally rigid, that is to say it is formed so as not to be bendable.

Figure 6:
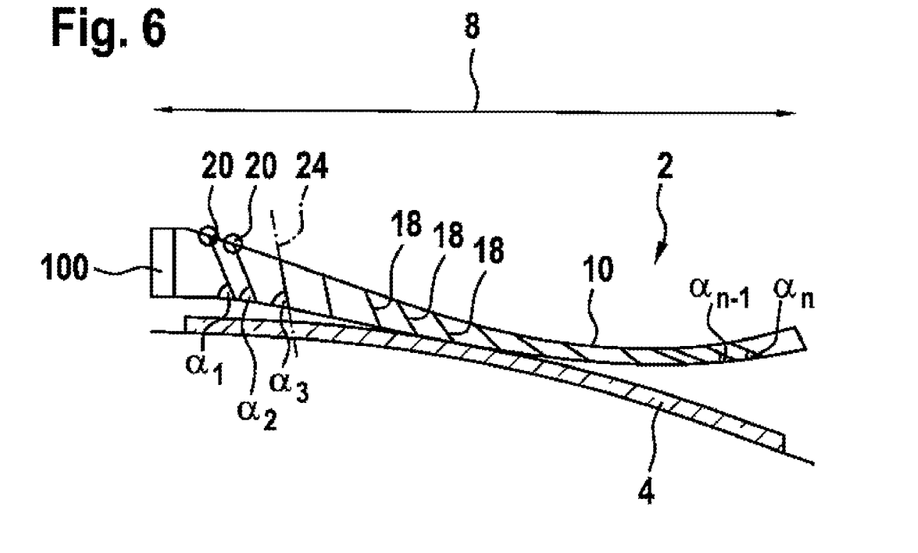
FIG. 6 shows a schematic illustration of a windscreen wiper device having a wiper blade according to other embodiments of the disclosure in a basic position.
Figure 7:
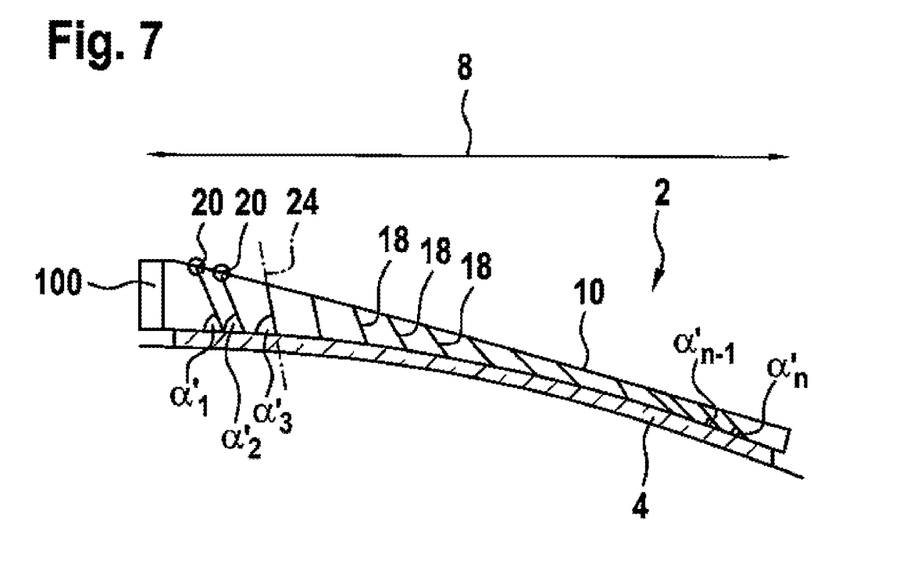
FIG. 7 shows a schematic illustration of the windscreen wiper device according to embodiments of the disclosure as shown in FIG. 6 in a position applied to a windscreen.

FIGS. 6 and 7 show schematic illustrations of a wiper blade 2 of a windscreen wiper device for a vehicle, in particular for a motor vehicle, in a basic position (FIG. 6), i.e. in an unloaded state, and in a position applied to a windscreen 4 (FIG. 7), according to the embodiments described herein. The wiper blade 2 comprises an elongated top part 10 and an elongated bottom part 12, which are configured to be at least partially bendable. Furthermore, provision is made of a plurality of connecting elements 18 for connecting the top part 10 and the bottom part 12, wherein the connecting elements 18 are spaced apart from one another along the longitudinal extent 8 of the wiper blade 2. The connecting elements 18 are designed to allow for a movement of the top part 10 and of the bottom part 12 in relation to one another with a movement component along the longitudinal extent 8 of the wiper blade 2. Moreover, the connecting elements 18 are arranged in such a way in relation to the bottom part 12 that, in an unloaded state of the wiper blade 2, an angle αn of the respective longitudinal axes 24 of the connecting elements 18 in relation to the bottom part 12 changes at least partially along the longitudinal extent 8 of the wiper blade 2, in particular changes constantly or changes in a monotonous or strictly monotonous manner.

In the wiper blade 2 shown in FIG. 6 in the unloaded state, the angles αn of the respective longitudinal axes 24 of the connecting elements 18 in relation to the bottom part 12, which change along the longitudinal extent 8 of the wiper blade 2, are denoted by α1, α2, α3, . . . αn−1, αn. In a loaded state of the wiper blade 2, i.e. in a position applied to the windscreen 4, as is shown by way of example in FIG. 7, the angles αn of the respective longitudinal axes 24 of the connecting elements 18 in relation to the bottom part 12 change compared to the unloaded state. In order to express this, in the wiper blade 2 shown in FIG. 7, which is located in a position applied to the windscreen 4, the angles αn of the respective longitudinal axes 24 of the connecting elements 18 in relation to the bottom part 12, which change along the longitudinal extent 8 of the wiper blade 2, are denoted by α'1, α'2, α'3, . . . α'n−1, α'n. According to some embodiments, at least two connecting elements have different angles, in particular at least 4 connecting elements each have different angles. By way of example, the angle can be between 5° and 45°. According to further embodiments of the disclosure, at least five connecting elements can be at an angle in the range of 60° to 120° in relation to the bottom part.

According to embodiments of the windscreen wiper device, which can be combined with other embodiments, the wiper blade 2 has at least a first region, in which the angle αn of the longitudinal axes 24 of the connecting elements 18 in relation to the bottom part 12 decreases, in particular decreases monotonously, in particular strictly monotonously, along the longitudinal extent 8 of the wiper blade 2 toward a wiper blade end. Furthermore, the wiper blade 2 can have at least a second region, in which the angle αn of the longitudinal axes 24 of the connecting elements 18 in relation to the bottom part 12 increases, in particular increases monotonously, in particular strictly monotonously, along the longitudinal extent 8 of the wiper blade 2 toward a wiper blade end. According to embodiments, as illustrated by way of example in FIGS. 6 and 7, the second region of the wiper blade 2, in which the angle αn of the longitudinal axes 24 of the connecting elements 18 in relation to the bottom part 12 increases along the longitudinal extent 8 of the wiper blade 2 toward a wiper blade end, is arranged at an inner position of the wiper blade 2 located in the proximity of the fastening device 100. It is thereby possible to provide a windscreen wiper device which allows for particularly good adaptation to the curvature of a windscreen 4. Furthermore, it is possible to provide a largely uniform contact pressure of the windscreen wiper device on the windscreen 4 and also a homogeneous distribution of force of the windscreen wiper device, such that a high wiping quality is provided.

According to embodiments of the wiper blade 2, which can be combined with other embodiments, the connecting elements 18, in particular in an unloaded state of the wiper blade 2, are fastened to the bottom part 12 in such a way that the longitudinal axes 24 of the connecting elements 18 extend at angles αn in relation to the bottom part 12 which lie between a lower angle limit value αnu and an upper limit value αno. According to embodiments, the lower angle limit value is αnu=10°, in particular αnu=15°, in particular αnu=20°, and the upper angle limit value αno=80°, in particular αno=90°, in particular αno=100°. This advantageously ensures that a force acting on the bottom part 12 is transferred in a particularly effective manner to the top part 10.

According to embodiments of the windscreen wiper device, which can be combined with other embodiments, the connecting elements 18 are configured in such a manner that the spacing between the top part 10 and the bottom part 12 changes at least partially along the longitudinal extent 8 of the wiper blade 2, in particular is reduced constantly in a first region and is increased constantly in a second region. The spacing between the top part 10 and the bottom part 12 along the longitudinal extent 8 of the wiper blade 2 can also encompass a region in which the spacing between the top part 10 and the bottom part 12 is substantially constant along the longitudinal extent 8 of the wiper blade 2. The spacing between the top part 10 and the bottom part 12 is greater at the fastening device 100 or the wiper-blade-side fastening part than at the opposite end, at which the connecting position 34 is located.

According to embodiments of the wiper blade 2, which can be combined with other embodiments, the value of the inner spacing (at the fastening device 100 or the wiper-blade-side fastening part) is at least 15 mm, in particular at least 25 mm, in particular at least 35 mm. According to embodiments, which can be combined with other embodiments, the value of the outer spacing is at least 10 mm, in particular at least 12.5 mm, in particular at least 15 mm. According to embodiments, which can be combined with other embodiments, the value of the central spacing is at least 7.5 mm, in particular at least 9 mm, in particular at least 12.5 mm.

As is illustrated by way of example in FIGS. 6 to 7, according to embodiments, which can be combined with other embodiments, the connecting elements 18 are connected in an articulated manner to the bottom part 12 and/or the top part 10. In particular, the connecting elements 18 are connected to the bottom part 12 and/or the top part 10 by means of a first film hinge 20. The first film hinge 20 can be formed in one piece with the connecting element 18 and the top part 10 and/or the bottom part 12. The single-piece configuration of the film hinges allows for simple and cost-effective production.

According to embodiments of the wiper blade 2, which can be combined with other embodiments described herein, the wiper blade 2 comprises a first region with a first curvature $\omega < 0$ and a second region with a second curvature $\omega > 0$. Furthermore, according to embodiments, the wiper blade 2 can have a third region with a third curvature $\omega < 0$, wherein the second region of the wiper blade 2 with the second curvature ω>0 is arranged between the first region with the first curvature ω<0 and the third region with the third curvature ω<0, as is shown by way of example in FIG. 6. It is therefore possible to provide a windscreen wiper device which makes it possible to realize a largely uniform contact pressure on the windscreen 4. Furthermore, it is possible to provide a windscreen wiper device which has an improved adaptation to the windscreen 4 and a high wiping quality.

What is claimed is:

1. A fastening device (100, 200) configured to fasten a windscreen wiper device on a fastening element (50) of a vehicle, wherein the fastening device (100) comprises:
   a main body (130) having a first receiving region (110) configured to have the fastening element (50) introduced therein, the main body (130) further including a second receiving region (150); and
   a securing element (120) mounted rotatably in the second receiving region (150) about a first axis of rotation (122), wherein the first axis of rotation (122) extends substantially perpendicular to a longitudinal extent of the fastening element (50), and wherein the securing element (120) is configured to form a direct, physical engagement with the fastening element (50) through a first rotation (124) about the first axis of rotation (122).

2. The fastening device (100, 200) according to claim 1, wherein the securing element (120) is configured to form a force fit with the fastening element (50) through the first rotation (124) about the first axis of rotation (122).

3. The fastening device (100, 200) according to claim 1, wherein the first receiving region (110) is an opening, recess or a through-hole in the main body (130) of the fastening device (100).

4. The fastening device (100, 200) according to claim 1, wherein the securing element (120) has a first portion (127) and a second portion (128), wherein the first portion (127) is configured for engagement with the fastening element (50), and wherein the second portion (128) is configured as an actuating device.

5. The fastening device (100, 200) according to claim 4, wherein the first portion (127) and the second portion (128) form a substantially L-shaped configuration.

6. The fastening device (100, 200) according to claim 1, wherein the engagement can be released by a second rotation directed counter to the first rotation (124).

7. The fastening device (100, 200) according to claim 1, wherein the first axis of rotation (122) is configured to extend substantially perpendicular to a second axis of rotation (52) of the fastening element (50).

8. The fastening device (100, 200) according to claim 1, comprising at least one stop element or limit stop element (210) configured to delimit the first rotation.

9. The fastening device (100, 200) according to claim 1, wherein the fastening device (100) is configured to be connected to a wiper blade.

10. A windscreen wiper device for a vehicle, comprising:
    the fastening device (100) according to claim 1; and
    a wiper blade (2) mounted on the fastening device (100).

11. The windscreen wiper device according to claim 10, wherein the wiper blade comprises:
    an elongated top part (10) configured to be at least partially bendable,
    an elongated bottom part (12) configured to be at least partially bendable,
    a plurality of connecting elements (18) for connecting the top part (10) and the bottom part (12), wherein the connecting elements (18) are spaced apart from one another along a longitudinal extent (8) of the wiper blade (2) and are fitted to at least one of the top part (10) and the bottom part (12) by means of a rotary joint (20).

12. The windscreen wiper device according to claim 10, wherein the wiper blade comprises:
    an elongated top part (10) configured to be at least partially bendable,
    an elongated bottom part (12) configured to be at least partially bendable,
    a plurality of connecting elements (18) for connecting the top part (10) and the bottom part (12), wherein the connecting elements (18) are spaced apart from one another along a longitudinal extent (8) of the wiper blade (2) and are fitted to at least one of the top part (10) and the bottom part (12) by means of a rotary joint (20), wherein the connecting elements (18) are configured to allow for a movement of the top part (10) and of the bottom part (12) in relation to one another with a movement component along the longitudinal extent (8) of the wiper blade (2).

13. The fastening device (100, 200) according to claim 1, wherein the securing element (120) is configured to form a form fit with the fastening element (50) through the first rotation (124) about the first axis of rotation (122).

14. The fastening device (100, 200) according to claim 13, wherein the securing element (120) is configured to also form a force fit with the fastening element (50) through the first rotation (124) about the first axis of rotation (122).

15. The fastening device (100, 200) according to claim 1, wherein the fastening device (100) is configured be connected releasably to a wiper blade.

16. The windscreen wiper device according to claim 1, wherein the second receiving region (150) includes an undercut (152).

17. The windscreen wiper device according to claim 16, wherein the securing element (120) includes a protrusion that is configured to slide within the undercut (152).

18. The windscreen wiper device according to claim 17, wherein the securing element (120) is L-shaped and includes a first leg portion configured to form the direct, physical engagement with the fastening element (50), and a second leg portion configured to be actuated to rotate the securing element (120).

19. The windscreen wiper device according to claim 1, further comprising the fastening element (50), wherein the securing element (120) is in direct contact with the fastening element (50).

20. The windscreen wiper device according to claim 19, further comprising a wiper blade (2), wherein the fastening device (100) is coupled to both the fastening element (50) and the wiper blade (2).

21. The windscreen wiper device according to claim 20, wherein the fastening element (50) is a drive shaft of the vehicle.

22. A method for fastening a fastening device for a windscreen wiper device on a fastening element of a vehicle, said method comprising:
    introducing the fastening element into a first receiving region of the fastening device; and
    rotating a securing element of the fastening device about a first axis of rotation extending substantially perpendicular to a longitudinal extent of the fastening element in order to form a direct, physical engagement of the securing element with the fastening element.

23. A method for releasing a fastening device for a windscreen wiper device from a fastening element of a vehicle, said method comprising:

rotating a securing element of the fastening device about a first axis of rotation extending substantially perpendicular to a longitudinal extent of the fastening element in order to release a direct, physical engagement of the securing element with the fastening element; and moving the fastening element and the fastening device apart.

* * * * *